US011195313B2

United States Patent
Guo et al.

(10) Patent No.: US 11,195,313 B2
(45) Date of Patent: Dec. 7, 2021

(54) CROSS-MODALITY NEURAL NETWORK TRANSFORM FOR SEMI-AUTOMATIC MEDICAL IMAGE ANNOTATION

(71) Applicant: INTERNATIONAL BUSINESS MACHINES CORPORATION, Armonk, NY (US)

(72) Inventors: Yufan Guo, San Jose, CA (US); Mehdi Moradi, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/294,289

(22) Filed: Oct. 14, 2016

(65) Prior Publication Data

US 2018/0108124 A1  Apr. 19, 2018

(51) Int. Cl.
| | |
|---|---|
| *G06T 11/60* | (2006.01) |
| *G06N 3/04* | (2006.01) |
| *G06K 9/46* | (2006.01) |
| *G06K 9/62* | (2006.01) |
| *G06N 3/08* | (2006.01) |

(52) U.S. Cl.
CPC ............ *G06T 11/60* (2013.01); *G06K 9/4628* (2013.01); *G06K 9/6274* (2013.01); *G06N 3/0454* (2013.01); *G06N 3/08* (2013.01); *G06K 2209/01* (2013.01); *G06K 2209/05* (2013.01)

(58) Field of Classification Search
CPC ......... G06T 7/0012; G06T 2207/20084; G06F 17/30256
See application file for complete search history.

(56) References Cited

U.S. PATENT DOCUMENTS

| | | | | |
|---|---|---|---|---|
| 5,331,550 A | * | 7/1994 | Stafford | G06K 9/3233 382/128 |
| 5,878,746 A | * | 3/1999 | Lemelson | G16H 30/40 600/407 |
| 6,320,976 B1 | * | 11/2001 | Murthy | A61B 5/0002 382/128 |
| 7,280,694 B2 | * | 10/2007 | Kim | G06K 9/00127 128/916 |

(Continued)

FOREIGN PATENT DOCUMENTS

| | | |
|---|---|---|
| WO | WO2016038535 A1 | 3/2016 |
| WO | WO2016124539 A1 | 8/2016 |

OTHER PUBLICATIONS

M. Mehdi et al., "A Cross-Modality Neural Network Transform for Semi-automatic Medical Image Annotation", Oct. 2, 2016, MICCAI 2016: Medical Image Computing and Computer-Assisted Intervention—MICCAI 2016, p. 300-307.*

*Primary Examiner* — Gandhi Thirugnanam
(74) *Attorney, Agent, or Firm* — Erik Huestis; Stephen Kenny; Foley Hoag, LLP (57) ABSTRACT

A cross-modality neural network transform for semi-automatic medical image annotation is provided. In various embodiments, an input medical image is mapped to a first vector in a text vector space. The first vector corresponds to the features of the medical image. A set of predetermined vectors is searched for a closest one of the predetermined vectors to the first vector. From the closest one of the predetermined vectors, one or more keywords is determined describing the input medical image.

4 Claims, 6 Drawing Sheets

(56) References Cited

U.S. PATENT DOCUMENTS

| | | | | |
|---|---|---|---|---|
| 7,324,676 B2 * | 1/2008 | Takeo | G06T 7/0012 | 378/37 |
| 7,430,308 B1 * | 9/2008 | Kallergi | G06T 7/0012 | 382/128 |
| 8,774,515 B2 * | 7/2014 | Mensink | G06K 9/00624 | 382/128 |
| 9,370,305 B2 | 6/2016 | Qian et al. | | |
| 2006/0074315 A1 * | 4/2006 | Liang | G06T 7/20 | 600/450 |
| 2007/0086655 A1 * | 4/2007 | Simard | G06K 9/4628 | 382/190 |
| 2007/0237377 A1 * | 10/2007 | Oosawa | G06K 9/3233 | 382/128 |
| 2009/0028403 A1 * | 1/2009 | Bar-Aviv | G16H 50/20 | 382/128 |
| 2009/0046905 A1 * | 2/2009 | Lange | A61B 5/0059 | 382/128 |
| 2009/0289942 A1 * | 11/2009 | Bailloeul | G06F 17/30256 | 345/440 |
| 2009/0297002 A1 * | 12/2009 | Zhang | G06T 7/0012 | 382/128 |
| 2010/0205142 A1 * | 8/2010 | Feulner | G06F 19/321 | 707/602 |
| 2012/0041779 A1 * | 2/2012 | Boroczky | G06Q 50/22 | 705/2 |
| 2013/0094733 A1 * | 4/2013 | Nosato | G06K 9/4671 | 382/128 |
| 2013/0114902 A1 * | 5/2013 | Sukthankar | H04N 21/23418 | 382/190 |
| 2014/0003697 A1 * | 1/2014 | Qian | G06F 19/321 | 382/131 |
| 2014/0375671 A1 * | 12/2014 | Giger | G06T 7/0012 | 345/589 |
| 2017/0140528 A1 * | 5/2017 | Handzel | G06K 9/34 | |
| 2018/0060652 A1 * | 3/2018 | Zhang | G06K 9/00362 | |
| 2018/0107796 A1 * | 4/2018 | Behar | G16H 50/50 | |
| 2018/0300878 A1 * | 10/2018 | Ihara | G06T 7/0014 | |
| 2018/0315193 A1 * | 11/2018 | Paschalakis | A61B 3/145 | |
| 2020/0218857 A1 * | 7/2020 | Shen | G16H 20/00 | |

* cited by examiner

CROSS-MODALITY NEURAL NETWORK TRANSFORM FOR SEMI-AUTOMATIC MEDICAL IMAGE ANNOTATION

BACKGROUND

Embodiments of the present invention relate to medical image annotation, and more specifically, to a cross-modality neural network transform for semi-automatic medical image annotation.

BRIEF SUMMARY

According to embodiments of the present disclosure, methods of and computer program products for medical image annotation are provided. An input medical image is mapped to a first vector in a text vector space. The first vector corresponds to the features of the medical image. A set of predetermined vectors is searched for a closest one of the predetermined vectors to the first vector. From the closest one of the predetermined vectors, one or more keywords is determined describing the input medical image.

According to embodiments of the present disclosure, methods of and computer program products for training a system for medical image annotation are provided. A plurality of medical images are read, each with an associated text segment. A feature vector is generated from each of the plurality of medical images. A vector in a text vector space is generated from each of the associated text segments. A neural network is trained to map the feature vectors to the vectors in the vector space.

According to embodiments of the present disclosure, systems for medical image annotation are provided. A trained convolutional network is operative to receive as input a medical image and output a feature vector corresponding to the medical image. A trained neural network is operatively connected to the trained convolutional network to receive as input the feature vector and output a first vector in a text vector space. A data store comprises a plurality of predetermined text vectors, and is operatively connected to the trained neural network to receive the first vector and provide closest of the predetermined vectors to the first vector.

DETAILED DESCRIPTION

There is a pressing need in the medical imaging community to build large scale datasets that are annotated with semantic descriptors. Given the cost of expert produced annotations, the present disclosure provide an automatic methodology to produce semantic descriptors for images. These can then be used as weakly labeled instances or reviewed and corrected by clinicians. In various embodiments, a neural network is provided that maps a given image to a new space formed by a large number of text paragraphs written about similar, but different images, by a human expert. Semantic descriptors are then extracted from the text paragraphs closest to the output of the transform network to describe the input image. Deep learning is used to learn mappings between images/texts and their corresponding fixed size spaces, with a shallow network as the transform between the image and text spaces. This limits the complexity of the transform model and reduces the amount of data, in the form of image and text pairs, needed for training it. In an exemplary embodiment, automatic descriptors are generated for Doppler images of cardiac valves, catching about 91% of disease instances and 77% of disease severity modifiers.

The availability of large datasets and today's immense computational power allow various data driven methods in computer vision. In some applications, it is fairly inexpensive to label images based on crowd sourcing methods and create datasets with millions of categorized images or use the publicly available topical photo blogs. However, a hurdle for fully utilizing the potential of big data in medical imaging is the expensive process of annotating images. Crowd-sourcing in simple annotation tasks is an option. However, the expert requirements for certain medical labeling and annotation tasks limit the applicability of crowd sourcing. More importantly, privacy concerns and regulations prohibit the posting of some medical records on crowd sourcing websites even in anonymized format.

Electronic medical records (EMR) are a natural sources of large data sets. One potential solution for establishing ground truth labels such as disease type and severity for images within EMR is automatic concept extraction from unstructured sources such as clinician reports stored with images. In many situations, however, the clinical reports are not available. In other situations, a clinical record consists of many images and only one report. In an echocardiography study of cardiac valves, for example, there may be many continuous wave (CW) Doppler images of four different cardiac valves. Typically these are stored as short videos. Only some patient records also include a cardiologist report (less than half in some datasets). Even when the report is available, there may be no matching between each image and passages of the text. For low level algorithm development tasks, such as learning to detect a specific disease from CW Doppler, individually annotated images are required.

The present disclosure addresses annotation of a set of medical images where a set of text reports from clinical records is available, written by clinicians based on images of the same modality from other patients. This may be a text data dump from the EMR. Access to the images matched to these reports is not necessary.

The subject matter of the present disclosure speeds up the process of labeling images for semantic concepts such as the imaged valve, disease type and severity by providing an initial automatic annotation driven by the text reports of similar images written by clinicians. To this end, a learned transform is provided between the image and text spaces. In some embodiments, a multilayer perceptron (MLP) neural network is used, which acts in the role of a universal function approximator, as opposed to a classifier. This transform network receives a fixed length representation of an image and outputs a vector in the space defined by fixed length representations of text reports. The process of learning the quantitative representation of images and texts is separated from the process of learning the mapping between the two. The former relies on rather large datasets and deep learning, while the latter uses a small neural network and can be trained by using a small set of paired images and text. The subject matter of the present disclosure is applicable to various modalities, including CW Doppler images. This methodology can significantly speed up the process of creating labeled datasets for training big data solutions in medical imaging.

Various embodiments of the present disclosure involve three networks: a transform network that acts as a mapping function and requires a fixed length feature vector describing the image as input and outputs a fixed length text vector as output; and two deep networks that act in the capacity of feature generators to map images and text paragraphs to their corresponding fixed length spaces. Various examples herein are described in the context of fast annotation of CW Doppler echocardiography images for the most common valvular diseases, namely regurgitation and stenosis, and the severity of these conditions. However, it will be apparent that the present disclosure is suitable for use with other modalities.

CW Doppler images are routinely used for the study of mitral, tricuspid, pulmonic, and the aortic valves. In the context of this specific problem, a fourth neural network is included in some embodiments that acts as a classifier to label the CW images for the valve. Separating this step limits the search space for the closest text paragraph in the final stage to only those text paragraphs that describe the relevant valve.

Figure 1:
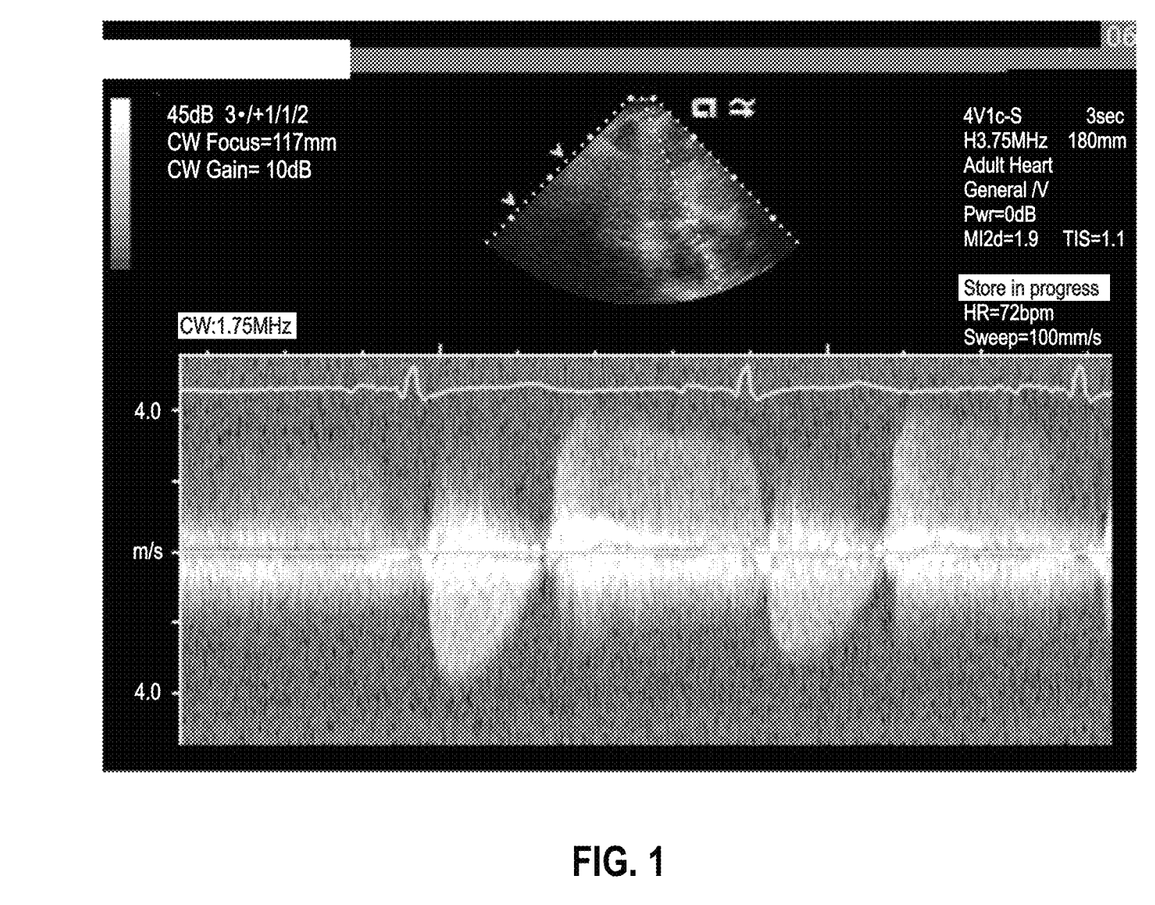
FIGS. 1-2 depict exemplary Doppler imagery suitable for analysis according to the present disclosure.
Figure 2:
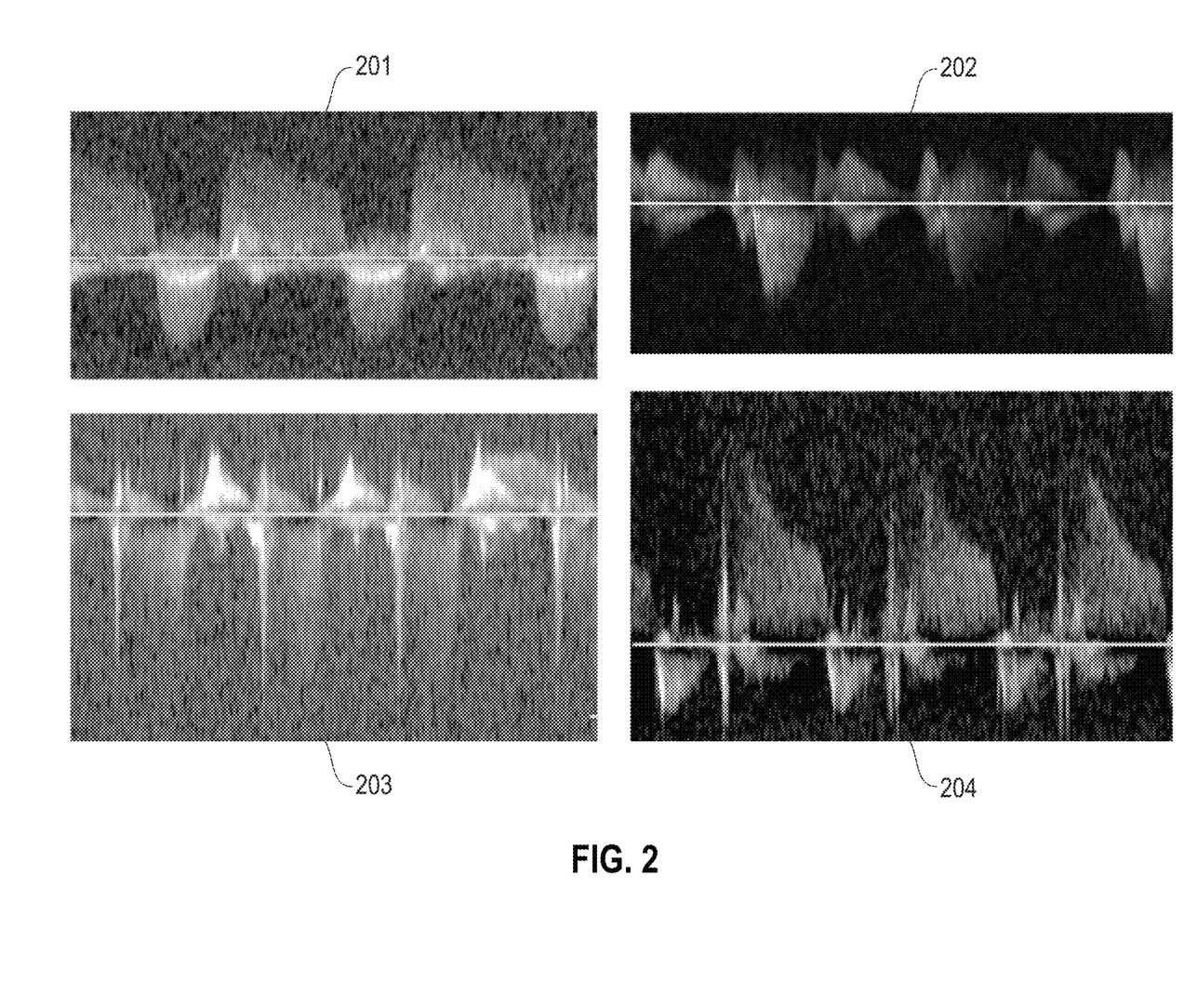

With reference now to FIGS. 1-2, examples of CW Doppler images are provided. In FIG. 1, a full CW image from the aortic valve is provided. In FIG. 2, region of interest CW images are provided of the aortic (201), mitral (202), tricuspid (203) and pulmonic (204) valve.

An exemplary corpus includes text data from the EMR of a hospital network, including 57,108 cardiac echocardiography reports. To prepare the data, paragraphs are isolated that focus on each of the four valve types. In many cases, echo reports include paragraphs starting with "Aortic valve:" and the like for mitral, pulmonic and tricuspid valves. In the exemplary corpus, applying this rule isolates 10,253 text paragraphs with a valve label.

Text can be represented as a fixed-length feature vector, composed of a variety of lexical, syntactic, semantic, and discourse features such as words, word sequences, part-of-speech tags, grammatical relations, and semantic roles. Despite the suitability of the aforementioned features in many text analytics tasks, especially in text classification, vector representations generated through traditional feature engineering have their limits. Given the complexity and exibility within natural languages, features such as bag of words or word sequences usually result in a high dimensional vector, which may cause data sparsity issues when the size of training data is incomparable to the number of features. Moreover, in a traditional feature space, words such as "narrowing," "stenosis," and "normal" are equally distant from each other, regardless of meaning.

Accordingly, embodiments of the present disclosure use a neural network language model to generate distributed representations of texts in an unsupervised fashion, in the absence of deliberate feature engineering. This network may be referred to as Doc2Vec. The input of the neural network includes a sequence of observed words (e.g., "aortic valve peak"), each represented by a fixed-length vector, along with a text snippet token, also in the form of a dense vector and corresponding to the sentence/document source for the sequence. The concatenation or average of the word and paragraph vectors is used to predict the next word (e.g., "velocity") in the snippet. The two types of vectors are trained on the 10,253 paragraphs. Training is performed using stochastic gradient descent via backpropagation. At the testing stage, given an unseen paragraph, the word vectors are frozen from training time and the paragraph vector is inferred.

The fixed length of the text feature vector m is a parameter in a Doc2Vec model. Since the length of the paragraphs is typically only two to three sentences, a short vector may be used. This also helps limit the complexity of the transform network as it defines the number of output nodes. In the exemplary embodiment discussed below, m=10.

In various embodiments, transfer deep learning is applied to create a vector of learned features to represent each image. Pre-trained large deep learners such as the convolution network designed by the Visual Geometry Group (VGG) of the University of Oxford are suitable as feature generators, as an alternative to computation and selection of handcrafted features. In various embodiments, VGG implementations are used such as those available through the MatConvNet Matlab library. This network consists of 5 convolution layers, two fully connected layers and a SoftMax layer with 1000 output nodes for the categories of the ImageNet challenge. The task-specific SoftMax layer may be ignored. Instead, a feature vector is harvested at the output of the fully connected layer (FC7) of the network.

The VGG network has several variations where FC7 layer has between 128 and 4096 nodes. In various embodiments, each CW image is run through the pre-trained VGG networks with both FC7 size of 128 and 4096. The former is used for the transform network training, and the latter is used for valve type classification network. The smaller feature vector size for the transform network is due to the fact that it defines the size of the input layer. Given the small size of the dataset used to train the transform network, the size of the image vectors are kept to 128 to minimize the number of weights. For the valve classifier network, the 4096 dimensional representation of the images is used since the size of the dataset is larger and the output layer is also only limited to the number of valve classes, which is four.

Since the text paragraphs may be separated based on the valve, the errors can be reduced and the search space limited in the final stage of the pipeline by first accurately classifying the images for the depicted valve exclusively based on the image features. In most cases, the text fields on the image (e.g., in FIG. 1) include clues that reveal the valve type and can be discerned using optical character recognition (OCR). However, various embodiments of the present disclosure instead apply a learning method. The classifier used in this work is an MLP network that uses the 4096 dimensional feature vector from VGG FC7 as input, has a single hidden layer, and four SoftMax output nodes each for one type of valve.

To train this valve classifier, manually reviewed images may be used as a training set. In an exemplary case, an expert-reviewed dataset of 496 CW images is used, each labeled with one of the four valve types. The network is optimized in terms of the number of nodes in the hidden layer using leave-one-out cross-validation. The exemplary results provided below are for a network with 128 nodes in the hidden layer.

Universal approximation theorem states that a feedforward neural network with a hidden layer can theoretically act as a general function approximator, given sufficient training data. The transform network used herein is designed based on this principle. This is the only network in the system described herein that necessarily requires images and clinical text paragraph pairs.

Since this network acts as a regressor as opposed to a classifier, the output layer activation functions are set to linear as opposed to SoftMax. To optimize the number of hidden nodes of this network and train the weights, a dataset of 226 images and corresponding text reports is sufficient, in a leave-one-out scheme. The network is optimized with the objective of minimizing the mean Euclidean distance between the output vector and the target text vector for the image. The optimal architecture had four nodes in the hidden layer.

Figure 3:
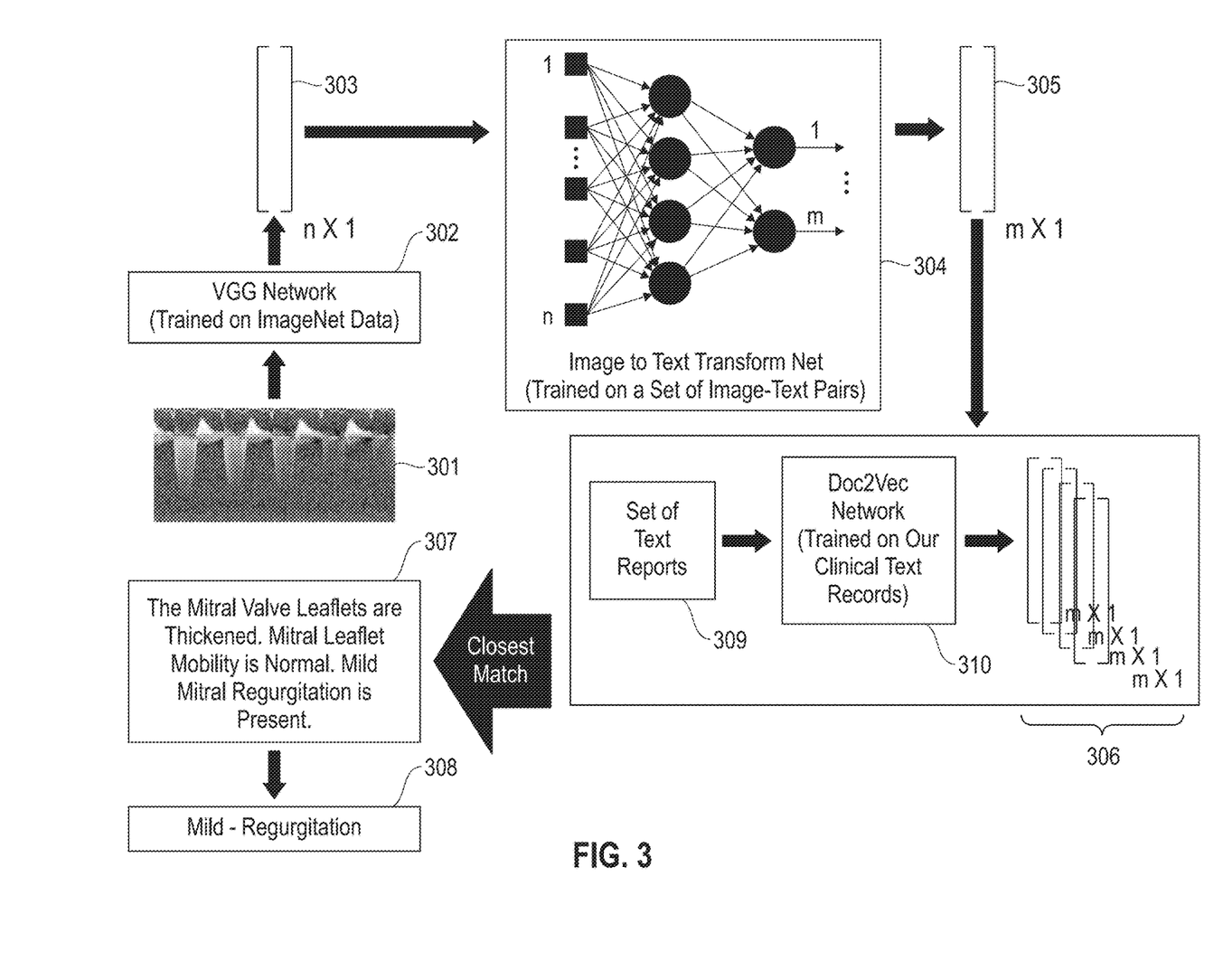
FIG. 3 illustrates a system for medical image annotation according to embodiments of the present disclosure.

Referring to FIG. 3, a system according to embodiments of the present disclosure is depicted. Given an input image, in some embodiments, the overall subject anatomy is determined for an input image by a pre-trained classifier. In some such embodiments, the valve type is determined using a valve classifier network (not pictured). The input image is then routed to an appropriate instance of the system based on the subject anatomy. The given image 301 is passed through the VGG network 302 to generate feature vector 303 of dimension n. In some embodiments, a histogram of Gaussian features is calculated to generate feature vector 303 instead of applying a convolutional network. The output vector 303 is fed to transform network 304 to obtain a vector 305 in the text space of dimension m. In some embodiments, the vector comprises a continuous distributed vector representation.

The text dataset 306 is searched to find the closest match for vector 305. The closest match 307, or top few, in terms of Euclidean distance of text vector are used for extraction of semantic descriptors 308 of the image. In some embodiments, Mahalanobis distance is used in place of Euclidean distance. The use of the valve classifier, or similar anatomical differentiator, reduces the cost of the search step by a factor of four as we only search the text paragraphs written for the same type of valve. The extraction of the semantic descriptors 308 from the retrieved paragraphs 307 is performed by a concept extractor that accurately identifies given descriptors in the text only when they are mentioned in the positive sense. Vectors 306 are generated form input text reports 309 by Doc2Vec 310.

The overall performance of this model is demonstrated on a holdout dataset of CW images that has not been used in the training or cross validation of the transform network or the valve classifier network. An exemplary set contains 48 CW images with corresponding text reports which were used only to validate the semantic labels extracted for the image. This test set includes 14 CW images of mitral, aortic, and tricuspid valves and six of the pulmonic valve.

The optimized automatic valve classifier achieves an accuracy of 96% on the test set, misclassifying only two of the 48 test samples, both in case of tricuspid valve. The OCR may improve this by correct determination of the valve type without the need for classification, when the information is recorded on the image.

Table 1 provides examples of real text segments and retrieved text segments applying an embodiment of the present disclosure, for a number of images in the test set. The retrieved paragraphs often include anatomic information about the valve that are not discernible from CW images. For example, the thickening of the valve is visible in B-mode images. Since the test set contains only CW images, the results are evaluated only for descriptors related to these images.

For the 34 test images of tricuspid, mitral, and pulmonic valves, the most common finding is regurgitation, present in 24 of the images. In 22 cases (91%) at least one of the top retrieved reports also reported regurgitation. The modifiers in this case included "trace," "mild," "moderate," and "severe." If extracted only from the top retrieved report, the modifier is underestimated in 9 (41%) of the positive regurgitation findings. This drops to 5 (23%) if the semantic descriptors are extracted from the top three retrieved reports.

In case of the aortic valve, the most critical finding is stenosis. Cardiologists report aortic stenosis following the guidelines of the American Heart Association (AHA) with "mild," "moderate," or "severe" modifiers. In the set of 14 independent cases of aortic valve CW images in the final test set, the original corresponding text paragraphs reported stenosis in five cases. In all five cases, the combination of the top three retrieved paragraphs provided "stenosis" as a descriptor. In one case, there was a finding of stenosis in the top retrieved paragraph, but not in the original report. Although further examination revealed that the case was positive based on one measure of stenosis (maximum jet velocity) and negative based on another measure (mean pressure gradient). For modifiers, in four cases the original modifier was "mild" and the true modifier was also either moderate or mild. In one case, the clinician had not reported a modifier and the retrieved paragraph reported "severe."

In Table 1, examples of the text segments retrieved with CW images are provided (right column) with the text segment from the original clinical report for the image (middle column).

TABLE 1

| valve imaged | corresponding report | retrieved text |
| --- | --- | --- |
| Aortic | "Aortic Valve: Aortic sclerosis present with evidence of stenosis. 55.1 mmHg, and the mean gradient is 27.0 mmHg, compatible with moderate stenosis." | "Aortic Valve: Severe aortic stenosis is present. The aortic valve peak velocity is 4.07 m/s, the peak gradient is 66.3 mmHg, and the mean gradient is 35.5 mmHg. The aortic valve area is estimated to be 0.61 $cm^2$. Moderate aortic valve insufficiency." |
| Mitral | "Mitral Valve: There is marked mitral annular calcification. The mitral valve leaflets are calcified. Mild mitral regurgitation is present." | "Mitral Valve: Mild mitral regurgitation is present." |

As set forth above, the presented disclosure provides for generating annotations, in the form of semantic disease related labels, for medical images based on a learned transform that maps the image to a space formed by a large number of text segments written by clinicians for images of the same type. A pre-trained convolutional neural network is used. In alternative embodiments, handcrafted feature sets such as histogram of gradients may be used as alternative image descriptors to CNN based features in this framework.

Although various exemplary embodiments provided herein are described in terms of stenosis and regurgitation, it will be apparent that the present disclosure is applicable to a variety of anatomies and a variety of modalities. For example, labels related to deficiencies such as valve thickening, calcification and decreased excursion may be obtained by application of the present disclosure. As examples in Table 1 show, in many cases the retrieved reports also include values of relevant measured clinical features. In some embodiments, the list of top matches is expanded and values appearing therein are averaged to obtain a rough estimate of the measurements for the image of interest. Inclusion of B-mode images may also improve the value of the retrieved paragraphs that often include features only visible in such images.

Figure 4:
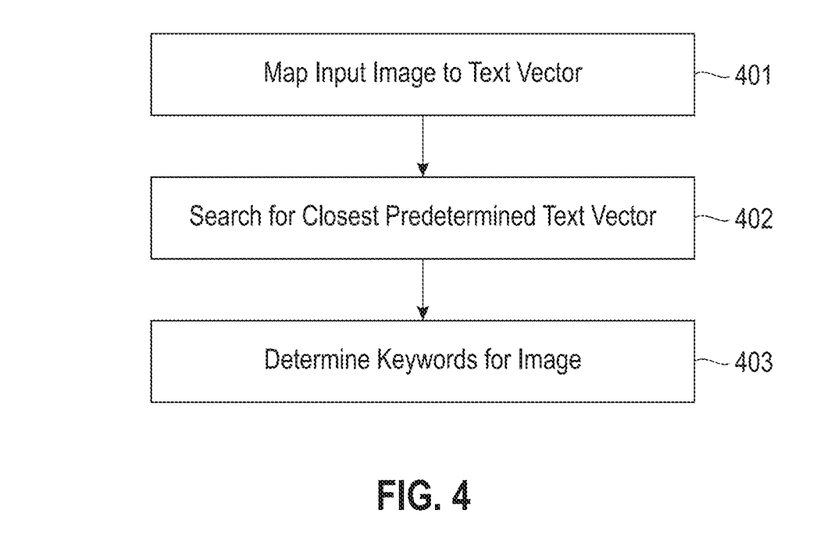
FIG. 4 illustrates a method for medical image annotation according to embodiments of the present disclosure.

Referring to FIG. 4, a method for medical image annotation is illustrated according to embodiments of the present disclosure. At 401, an input medical image is mapped to a text vector corresponding to the features of the medical image. At 402, a set of predetermined text vectors is searched for a closest one of the predetermined text vectors. At 403, from the closest one of the predetermined text vectors, one or more keywords are determined describing the input medical image.

Figure 5:
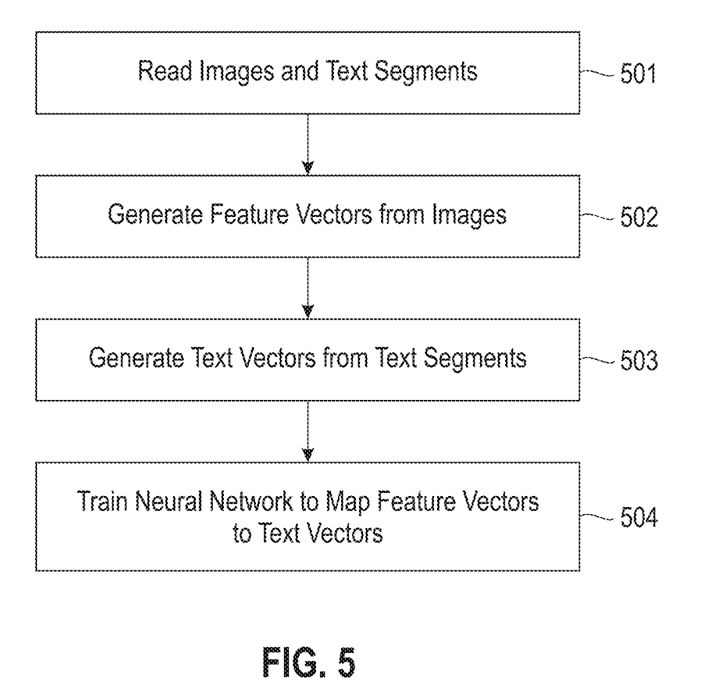
FIG. 5 illustrates a method for training a system for medical image annotation according to embodiments of the present disclosure.

Referring to FIG. 5, a method for training a system for medical image annotation is illustrated according to embodiments of the present disclosure. At 501, A plurality of medical images are read, each with an associated text segment. At 502, a feature vector is generated from each of the plurality of medical images. At 503, A text vector is generated from each of the associated text segments. At 504, a neural network is trained to map the feature vectors to the text vectors.

Figure 6:
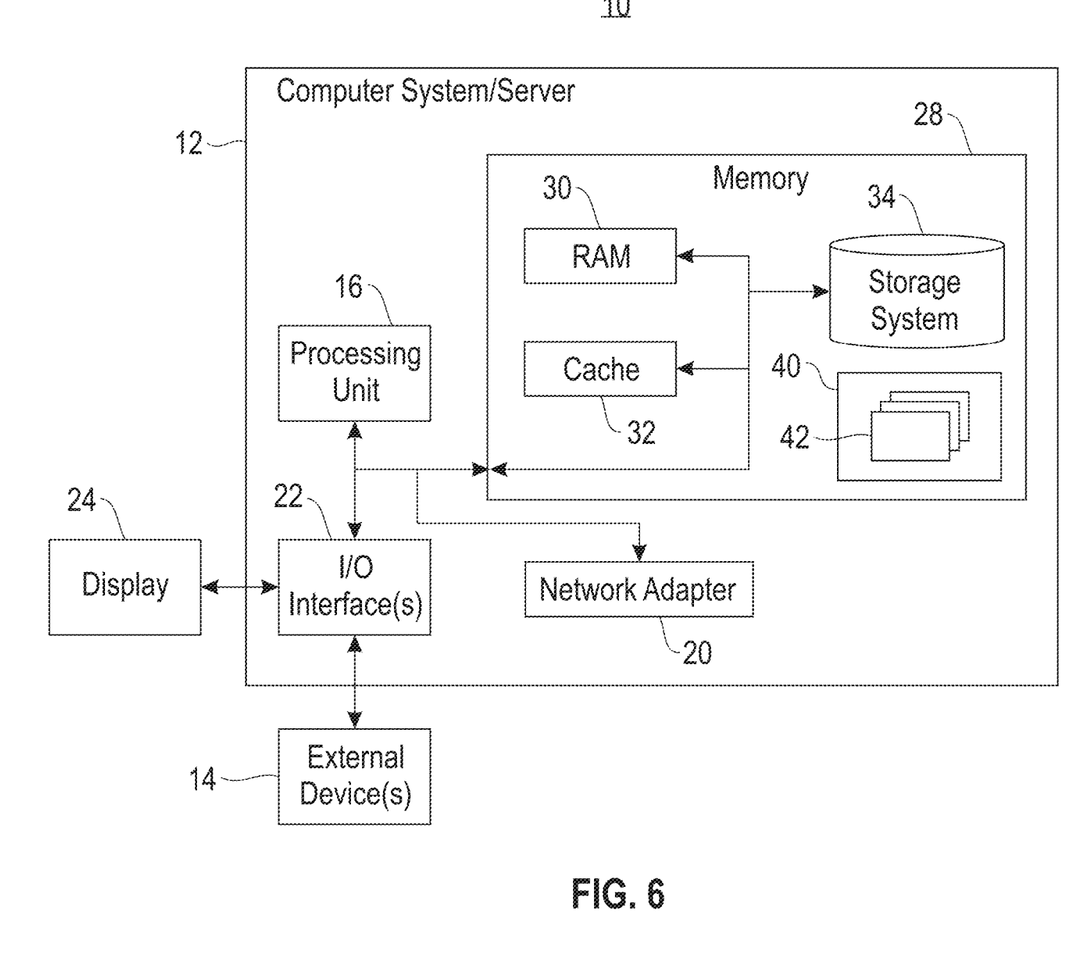
FIG. 6 depicts a computing node according to an embodiment of the present invention.

Referring now to FIG. 6, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a trained convolutional network operative to receive as input a medical image and output an image feature vector corresponding to the medical image, the image feature vector having a first dimension;
    a trained neural network operatively connected to the trained convolutional network to receive as input the feature vector and transform the image feature vector into a predicted document vector, the predicted document vector representing vectorization of a predicted text report, the predicted document vector having a second dimension;
    a data store comprising a plurality of predetermined document vectors in a text vector space, the text vector space including the predicted document vector, the plurality of predetermined document vectors being determined by a trained learning system configured to receive a plurality of text reports and output a predetermined document vector for each text report, the predetermined document vectors having the second dimension, the data store operatively connected to the trained neural network; and
    a computing node comprising a computer readable storage medium having program instructions embodied therewith, the program instructions executable by a processor of the computing node to cause the processor to perform a method comprising:
        determining a closest vector of the predetermined document vectors to the predicted document vector,
        determining, via concept extraction, one or more keywords describing the medical image from the closest vector, the one or more keywords comprising a semantic descriptor of the medical image, and
        assigning the one or more keywords to the medical image.

2. The system of claim 1, wherein the neural network is a feedforward neural network.

3. The system of claim 1, wherein the closest vector of the predetermined document vectors is determined by distance within the text vector space of the predetermined document vectors to the first vector.

4. The system of claim 1, wherein the closest vector of the predetermined document vectors is determined by Mahalanobis distance within the text vector space of the predetermined document vectors to the first vector.

* * * * *